July 14, 1931.     F. W. ERICKSON     1,814,675
POWER CUTTER FOR ROUND METAL OBJECTS
Filed Oct. 24, 1930     2 Sheets-Sheet 1
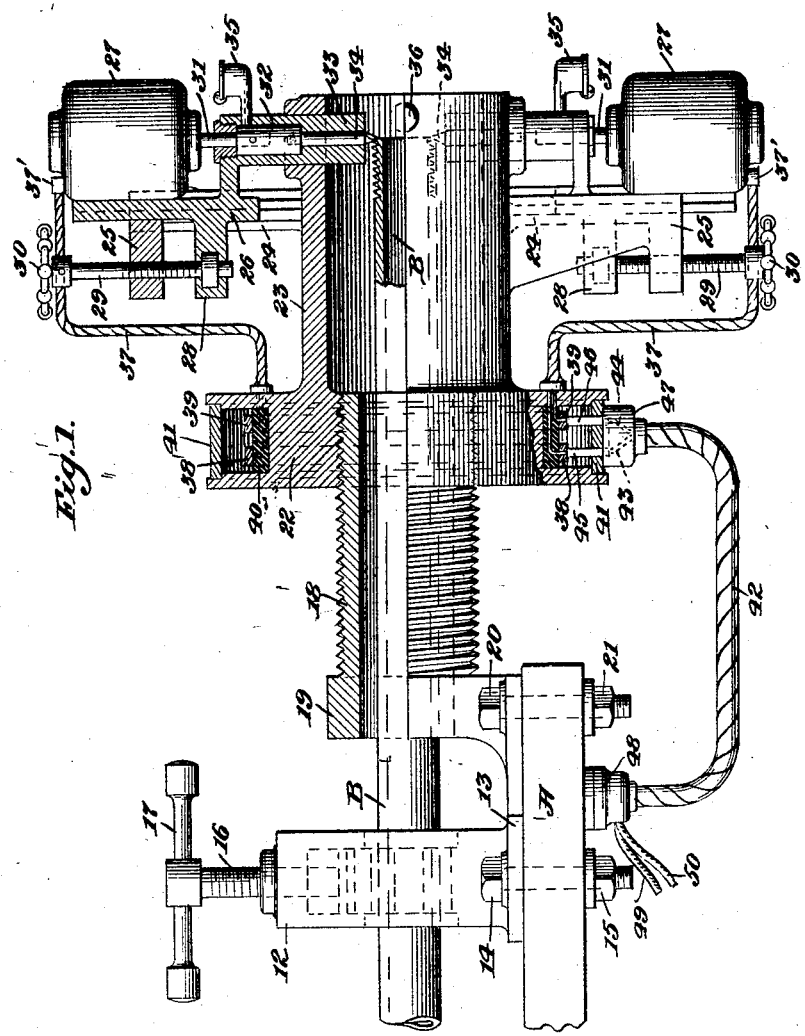
Inventor:
Frederic W. Erickson,
by
A. W. Harrison
Att'y.

July 14, 1931.  F. W. ERICKSON  1,814,675
POWER CUTTER FOR ROUND METAL OBJECTS
Filed Oct. 24, 1930  2 Sheets-Sheet 2
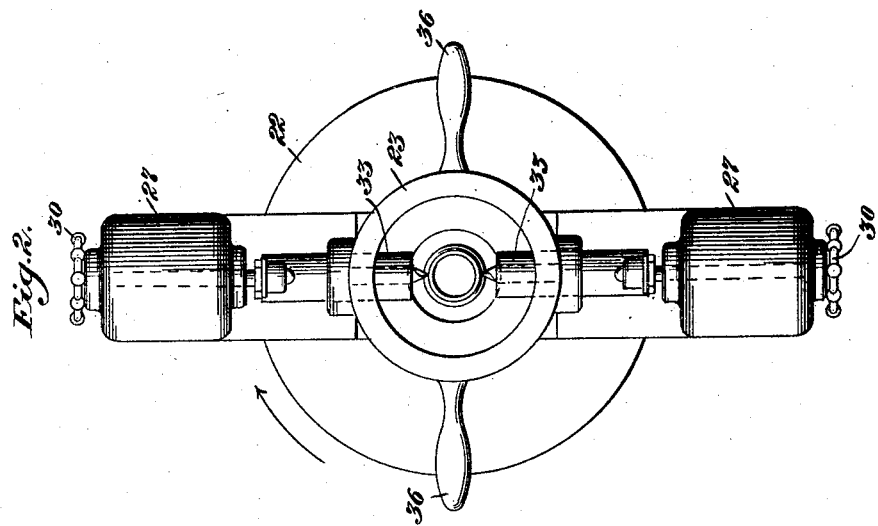
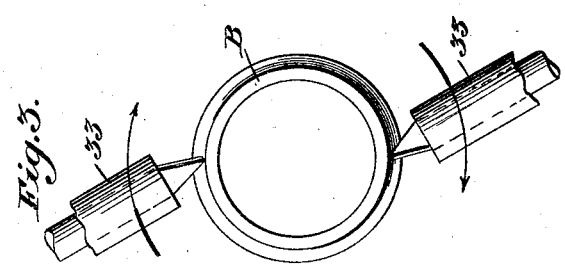
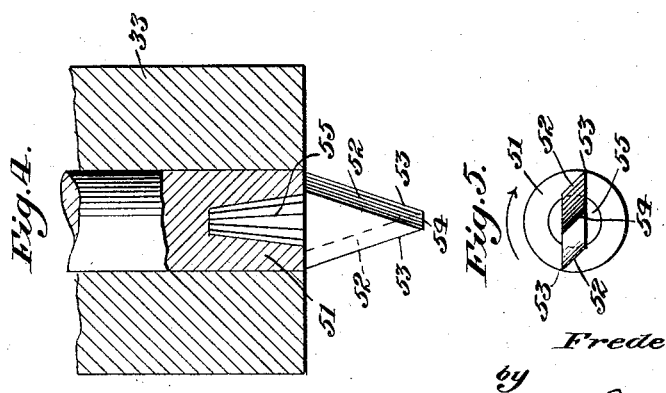
Inventor:
Frederic W. Erickson,
by
A. W. Harrison
Att'y.

Patented July 14, 1931

1,814,675

UNITED STATES PATENT OFFICE

FREDERIC W. ERICKSON, OF LARCHMONT, NEW YORK

POWER CUTTER FOR ROUND METAL OBJECTS

Application filed October 24, 1930. Serial No. 491,030.

This invention relates to tools or mechanism for cutting round metal objects such as conduits for electrical wiring, or rods, and has particular reference to facilitating the production of screw-threads in such objects.

The most commonly practiced method of forming a screw-thread on a pipe or rod, or cutting it, is to rotate the article and gradually move a cutting tool inwardly against the rotating surface. It is not always easy or practical to rotate a pipe or rod, especially when either very long or large, and therefore the object of my invention is to enable a pipe or rod to be threaded or cut at high speed, and without manual labor, and while the pipe or rod is stationary.

With said object in view my invention consists in the construction and combination of parts substantially as hereinafter described and claimed.

Of the accompanying drawings, Figure 1 is a side elevation of my improved tool or appliance, partly broken out and in section.

Figure 2 is an end view of the right hand portion of the tool.

Figure 3 is a detail view illustrating a sometimes preferred mounting of the cutters.

Figure 4 is a sectional detail illustrating a preferred form of the cutter or cutters.

Figure 5 is a view of the cutter looking upward from Figure 4.

Similar reference characters indicate similar parts or features in all of the views.

The tool or appliance is suitably supported as on a bench, a portion of which is indicated at A, while a pipe or rod B is gripped in a vise 12, the base 13 of which is firmly mounted upon the bench as by means of bolts 14 and nuts 15. The clamping or gripping effect is obtained by means of a screw 16 having a handle 17.

A tubular screw-threaded guide 18 having an end block 19 is also suitably secured to the bench A as by means of bolts 20 and nuts 21.

Mounted on the threaded guide 18 is an internally threaded ring 22 which is a part of the body of the tool cutter, the parts of which will be presently described. The said ring 22 is peripherally recessed for a purpose that will be described.

The tubular portion 23 of the tool carrier has outwardly extending brackets provided with slideways 24 each having a lug or bracket 25. Mounted in each slideway is a slide 26 which supports an electric motor 27, said slideway having a lug 28. An adjusting screw 29 threaded to an aperture in the lug 25 has a portion rotatably mounted in the lug 28 of the slide and has a hand-wheel 30 whereby the slide and its motor and other parts presently described can be adjusted relatively to the axis of rotation of the tool body 22—23.

Each electric motor has a shaft 31 to which is connected a tool-holder 32 mounted in a bearing 33 which is preferably a part of the slide 26. Each tool-holder 32 carries a cutting tool 34 of a similar type to a drill or routing tool. To provide for lubrication oil cups 35 are provided.

To enable the body and motors and tools to be rotated manually the tubular portion 23 is provided with outwardly projecting handles 36.

Cables 37 are connected at one end to connection blocks 37' of the casings of the motors 27, the wires in each of said cables being connected to conducting rings 38—39 supported on an insulating ring 40 in the peripheral recess of the body ring portion 22, said recess being enclosed by an outer metal ring or rim 41 which, in operation, remains substantially stationary. In other words, it is slidable in its relation to the head 22.

A cable 42 contains wires 43—44 which lead to contact brushes 45—46 extending through the ring 41 and contacting with the rings 38—39. Said contact brushes extending inwardly from a connecting block 47 to which the cable 42 is connected at one end, said cable being connected at the other end to a block 48 suitably mounted under the bench A, and the said wires of the cable 42 are connected in the block 48 to wires 49—50 forming the circuit from any suitable source of electrical supply.

Before describing the operation, reference will first be made to Figure 3 which illustrates somewhat diagrammatically that the bearings 33 for the cuttting tools need not be in exact opposite radial directions as illustrated in Figure 2, but somewhat inclined relatively to such radial positions.

Whether the tools are mounted as illustrated by Figures 2 and 3, or otherwise, it is preferable that they shall have special hardened steel tips for effecting the cutting. Such formation of the tools is illustrated by Figures 4 and 5 in which a tool-holder 51, substantially similar to the tool-holder 32 of Figure 1, has removably but securely mounted therein a tool having beveled sides 52 and sharp cutting edges 53, the sides and edges of the tool being tapered and meeting at the sharp edge tip 54. The shank 55 of this tool is tapered and is suitably formed so as to engage and remain in a tapered socket formed in the lower end of the holder 51.

The operation of the tool or implement will first be described for cutting a thread around a pipe or rod. With the motors and the cutting tools first located in positions far enough apart to permit the presence of a pipe or rod between the tips of the cutting tools, such rod or pipe is secured in the vise by means of the screw 16, with such pipe or rod in such longitudinal position as to effect cutting of a screw-thread either at the end thereof or at some distance from said end. Sometimes it is desirable to cut a screw-thread around a rod or pipe at some distance from its end.

With the pipe or rod mounted as described, the handles 30 of the adjusting screws 29 are operated to move the slides 26 inwardly until the tips of the cutting tools engage the pipe or rod, and the electric motors are started through the medium of any suitable switch or controlling device, not necessary to illustrate or describe in detail, thereby causing the cutting tools 34 to rotate on their axes. Then, by means of the handles 36 of the body the entire body is rotated. Either during such rotation or prior thereto the adjusting screws 29 are operated so as to move the slides further inward to cause the cutting tools to operate to sufficient depth in the surface of the rod or pipe. The rotation of the body causes the cutting tools to move about the axis of the pipe or rod in a direction corresponding with the screw-threads of the tubular guide 18, this being because the internal screw-threads of the ring 22 of the body coact with the threads of the guide 18. The result of this is that the pipe or rod is formed with a screw-thread as indicated in Figure 1 which, for convenience of illustration, indicates that the cutting tools have been returned to the end of the pipe or rod after having formed a screw-thread therein.

If now, instead of forming a screw-thread in a pipe or rod it is desired to cut it off, it is only necessary, instead of rotating the body so completely as has been described for forming a screw-thread, it will be only rotated part way and back again, the adjusting screws 29 being in the meantime or intermittently operated to gradually shift the slides which carry the motors and cutting tools inwardly toward the center of the appliance.

While it is preferable to employ two motors and two cutting tools substantially opposite each other as illustrated by either of Figures 2 and 3, it is to be understood that I do not limit myself to such duplication but may, for some purposes, employ but one of the cutting tools and motors. This might be effected either by entirely omitting one of the cutting tools and motors from the appliance, or if two are employed, leaving one of them in its outermost position and only adjusting one of them inwardly.

Having now described my invention, I claim:

1. A tool for cutting a round metal object while the latter is stationary, said tool comprising a rotary body having a cutter extending inwardly toward the axis of rotation of said body, an electric motor radially mounted on said body for actuating said cutter, and means for adjusting said motor and cutter radially.

2. A tool for cutting a round metal object while the latter is stationary, said tool comprising a rotary body having oppositely disposed cutters extending inwardly toward the axis of rotation of said body, electric motors radially mounted on said body for actuating said cutters, and means for adjusting said motors and cutters radially.

3. A tool for cutting a round metal object while the latter is stationary, said tool comprising a rotary body having oppositely disposed cutters extending inwardly toward the axis of rotation of said body, electric motors radially mounted on said body for actuating said cutters, and means being provided for adjusting the motors and cutters in the direction of the lengths of the cutters.

4. Mechanism for cutting a round metal object while the latter is stationary, comprising an externally threaded tubular member through which such object may extend, a rotatable body having an internally threaded portion fitting the said externally threaded member to impart longitudinal movement to said body relatively to said tubular member when rotated, said body having a cutter extending inwardly toward the axis of rotation of said body, an electric motor radially mounted on said body for actuating said cutter, and means for adjusting said motor and cutter radially.

5. A device of the character described comprising a rotatable hollow body having a screw-threaded connection with a support, an electric motor carried by said body, a cutter operatively connected with said motor, an insulating ring carried by said body, a pair of conducting rings surrounding said insulating ring, conducting brushes contacting with the conducting rings, means for holding said brushes substantially stationary relatively to said support conducting wires connected to said brushes, and electric connections between said conducting rings and motor.

6. A device of the character described comprising a rotatable hollow body having a screw-threaded connection with a support, electric motors carried by said body, cutters operatively connected with said motors, an insulating ring carried by said body, a pair of conducting rings surrounding said insulating ring, conducting brushes contacting with the conducting rings, means for holding said brushes substantially stationary relatively to said support conducting wires connected to said brushes, and electric connections between said conducting rings and the motors.

In testimony whereof I have affixed my signature.

FREDERIC W. ERICKSON.